United States Patent [19]
Martin

[11] Patent Number: 5,507,351
[45] Date of Patent: Apr. 16, 1996

[54] CLEANER FOR TINED WHEELS

[76] Inventor: Howard Martin, 169 Allegre Rd., Elkton, Ky. 42220

[21] Appl. No.: 187,211

[22] Filed: Jan. 25, 1994

[51] Int. Cl.[6] .................................................. A01B 15/16
[52] U.S. Cl. ........................... 172/558; 172/559; 172/610; 111/139
[58] Field of Search ........................... 37/195, 423, 449; 111/123, 136, 139, 170, 157, 162, 165; 172/117, 197, 558, 559, 776, 610

[56] References Cited

U.S. PATENT DOCUMENTS

| | | | |
|---|---|---|---|
| 1,298,209 | 3/1919 | Heylman | 172/558 |
| 1,457,960 | 6/1923 | Britten | 172/558 X |
| 1,721,876 | 7/1929 | Davis et al. | 172/558 |
| 1,723,705 | 8/1929 | Packer | 172/558 |
| 1,837,347 | 12/1931 | Vandine | 172/558 |
| 2,442,727 | 6/1948 | Hyland | 172/558 |
| 3,261,411 | 7/1966 | Youngberg et al. | 172/559 |
| 3,438,448 | 4/1969 | Richey et al. | 172/558 |
| 4,858,699 | 8/1989 | Poltrock | 172/558 |

OTHER PUBLICATIONS

Dawn Equipment Catalog entitled "Weedwheel", p. 11.

Primary Examiner—Randolph A. Reese
Assistant Examiner—Robert Pezzuto
Attorney, Agent, or Firm—Rockey, Rifkin & Ryther

[57] ABSTRACT

This invention provides an improved apparatus for maintaining tooth rotating wheels, which are used to penetrate the soil either as a cultivating apparatus, a row cleaning apparatus, or as closing apparatus for row planters free of mulch, trash, dirt and/or rocks. By removing the debris from the space between the teeth on the wheel, the wheel can penetrate the soil to a controlled or desired depth as set by the operator. Debris between the wheels can limit the depth of penetration by the formation of a solid or semi-solid mass generally resembling of variable rim diameter. The wheels may be driven by a power mechanism or may be rotated by the penetration in the ground and the forward motion of a propulsion unit.

The toothed wheel is kept clean of debris, thereby allowing accurate depth penetration as determined by conditions and requirements.

8 Claims, 3 Drawing Sheets

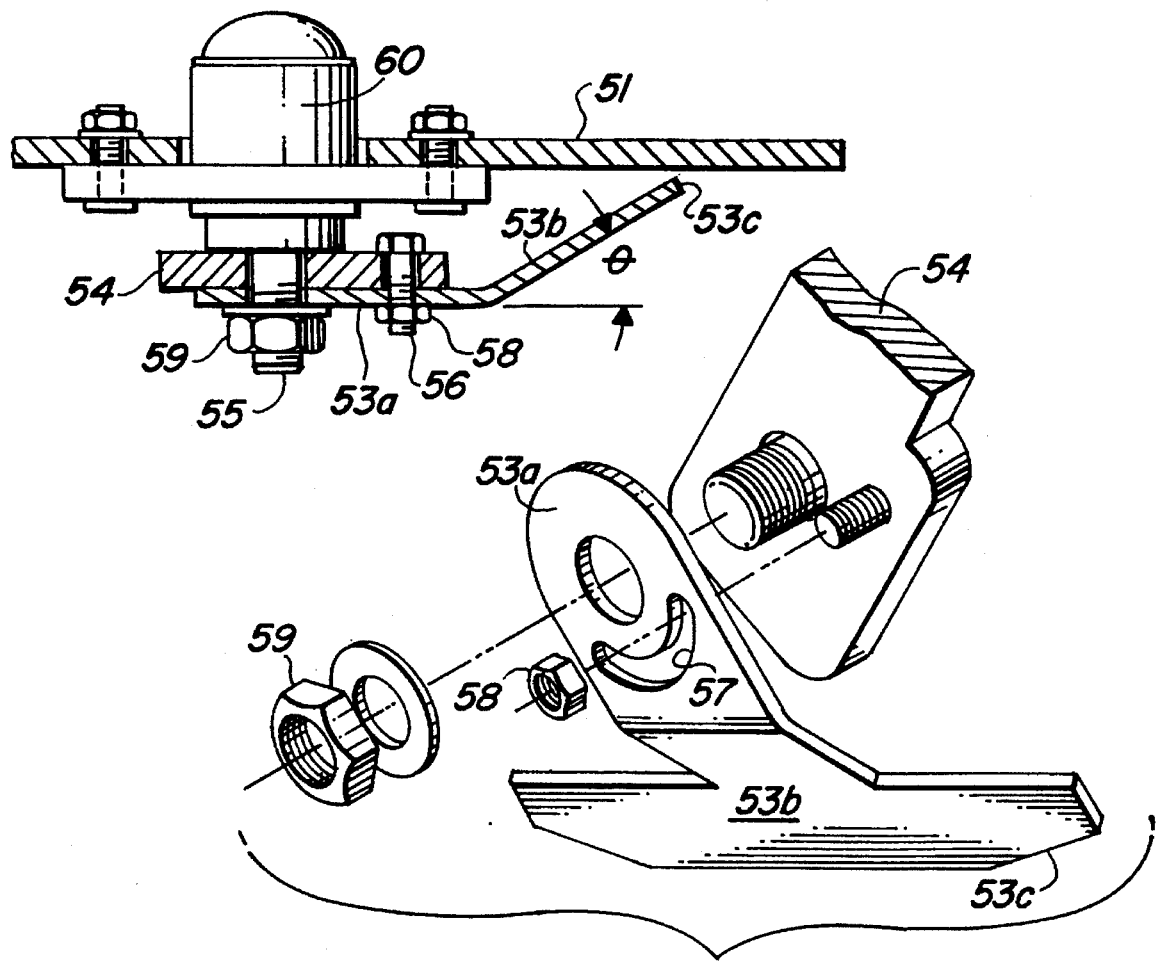

CLEANER FOR TINED WHEELS

BACKGROUND OF THE INVENTION

1) Field of the Invention

The present invention relates to rotary ground-driven or powered tillage farming equipment. Such tillage equipment is particularly useful in conjunction with row crop planters and/or so called rotary hoes. More specifically, this invention relates to maintaining debris free straight or inclined pointedly toothed wheels mounted on a row planter unit or tillage equipment. In the specific application described here, the toothed wheel was utilized with a planting device.

Historically, farmers have relied upon conventional or deep tilling to prepare their fields for planting. A system known as no-till or low-till has recently emerged, whereby fields are not deep plowed but are tilled at a shallower depth by rotary hoe or tillage devices or the planter itself may be modified to open a furrow of predetermined depth in unplowed ground and plant the seeds in the furrow. In the later instance, the residue left behind from harvesting poses a problem for accurate planting but the residue is also useful in minimizing soil erosion either from wind and/or rain.

The mulched residue has an undesirable effect on planting because if not cleared ahead of the row unit of the planter the residue can result in inaccurate planting depth. This occurs because concentrations of mulch may vary the depth setting of the planter relative to the ground. The mulch when being cleared can also affect the row cleaning effort by filling the area between the teeth of the row cleaner, thus hindering proper row cleaning.

2) Related Art

The prior art likewise reflects a number of tillers or cultivators not related to planters employing rotating tined wheels. An example thereof may be found in U.S. Pat. No. 3,605,907, issued to Shuring, et al., 9/71. These prior art devices are designed and used for deeper tillage or cultivation of the soil and also have at least as great a problem with the accumulation of mulch, rocks and/or dirt between the teeth when operating in relatively wet soil. The equipment may also be operated in dry soil, in which case applicant's present invention may or may not be required depending upon the conditions, including soil structure, moisture and debris.

BRIEF SUMMARY OF THE INVENTION

The present invention is beneficially used with rotating tined or toothed wheels in soil to remove the accumulation of residue including soil between the teeth, the accumulation preventing the wheels from penetrating the soil to a desired depth. In the prior art, various shield methods have been employed to try to limit this accumulation of residue and also to prevent the wrapping of material on the hub.

One such system is shown in the prior art, U.S. Pat. No. 4,785,890, patent is effective only when the tined wheels are operating at an angle to a closely trailing cutting disc that is engaged in the soil. This allows long residue to be cut while the tines pull the remainder of the residue apart. This method is explained in detail in my U.S. Pat. No. 4,785,890. This system will minimize wrapping and filling with residue of the cleaning wheels when being utilized with a disc to clean the row ahead of the planter, but is not effective in preventing tooth packing, i.e., the accumulation of dirt and residue between the teeth of the wheel. Tooth packing occurs more readily when short residue that may be damp becomes mixed with soil that may be wet. The soil is spaded-up as the teeth rotate through it and packing may occur even without residue if the soil has a certain moisture content and has certain other characteristics.

When the space between the teeth becomes packed the teeth are no longer effective at either moving residue or penetrating the soil to the depth desired. The packed soil between the teeth determines the depth of penetration. Applicant's invention is designed to solve this problem and prevent the packing of residue and/or soil in tined wheels either during row cleaning, row closing or cultivation.

BRIEF DESCRIPTION OF THE DRAWINGS

FIG. 3 is a sectional view taken along lines 33 in FIG. 2;

FIG. 4 is a exploded diagrammatic view illustrating the mounting of applicant's invention;

DETAILED DESCRIPTION OF THE INVENTION

Figure 1:
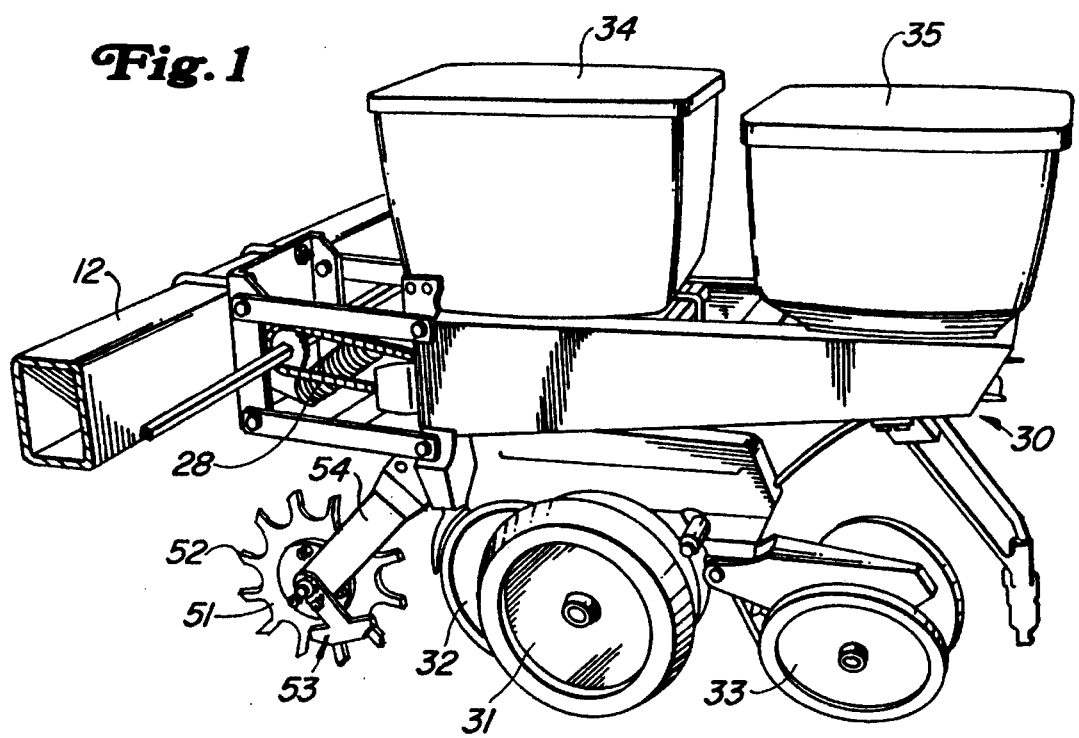
FIG. 1 is a simplified view of a row crop planter unit carrying the row cleaner with applicant's invention attached to the rotating tined wheel.
Figure 5:
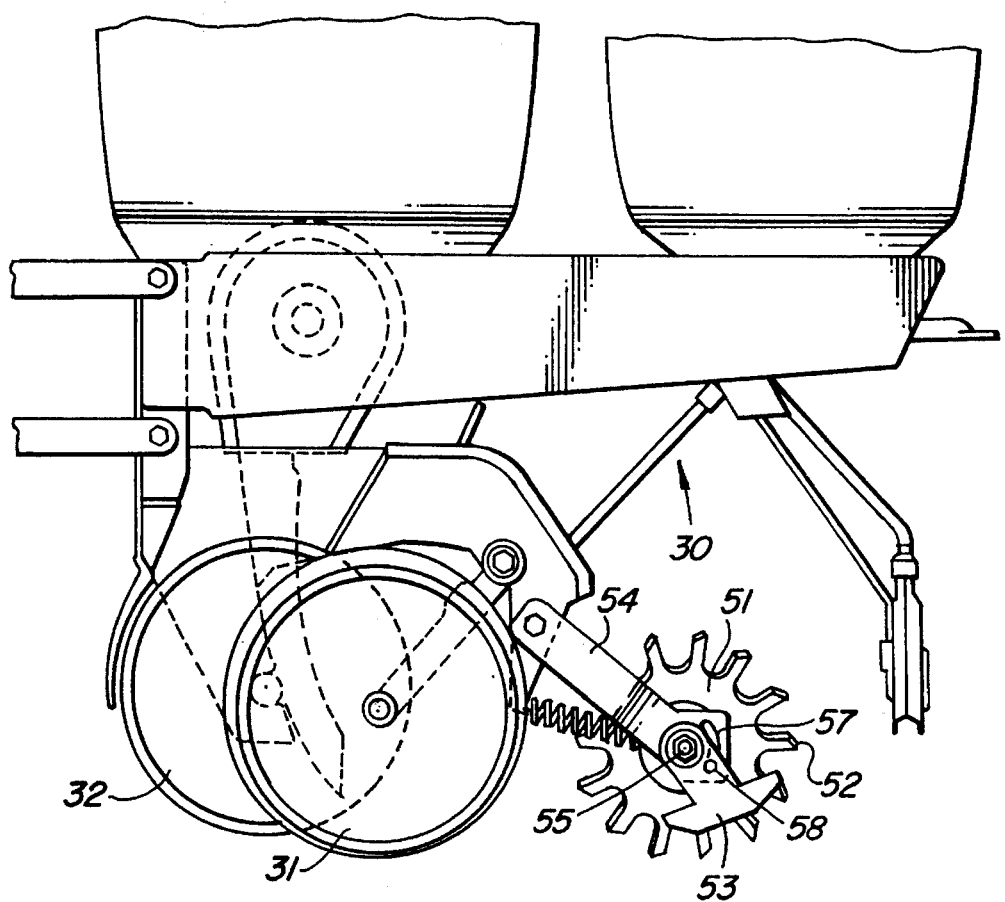
FIG. 5 is a simplified view of a row crop planter unit carrying the closing device with applicant's invention applied to the rotating tined wheels for closing a furrow.

Referring now to the drawings in which the same reference numerals designate the same elements throughout the several views, there is shown in FIG. 1 a simplified side elevation view of a row planter carrying a row cleaner with applicant's invention mounted thereon. FIG. 5 is a simplified side elevation view of a row planter, including a pair of rotating tined closing wheels with applicant's invention mounted thereon. The planter unit is conventional and has been thoroughly described and is well known in the prior art and will not be discussed in detail herein.

As shown in FIG. 1 and FIG. 5, the planter generally designated 30 is mounted to a frame generally designated 12 and may include a transverse tool bar not shown. The tool bar may mount a plurality of planting units to similar to that shown in FIG. 1 and FIG. 5.

The conventional planter unit has three key operational components in contact with the ground. The angular and spatial relationships of these components are illustrated in FIGS. 1 and 5. This includes two furrow row cleaning wheels 51 with the rotating cleaning wheels 51 rotating about axis 55. A pair of inclined discs 32 will open the furrow and form no part of the present invention. A plurality of spaced gauge wheels 31 follow the furrow opening means and support the planter unit 30 as it is pulled across the field. Gauge wheels 31 are journaled for rotation about axes substantially perpendicular to the direction of travel. Seed placement means not depicted, place the seeds in the furrow opened by the disc means and the furrows are closed by the trailing closing wheels 33 which may be as shown in FIG. 1 or may have a plurality of tines as shown in FIG. 5. As discussed in my U.S. Pat. No. 4,785,890 referenced above, the toothed row cleaning wheels 51 are independently journaled for rotation about inclined intersecting axes.

Details of mounting are not part of the present invention and may for example be those described in U.S. Pat. No. 4,425,973 issued on Jan. 17, 1984 in the name of Donald E. Williams and Forest E. Robertson. Though cleaning wheels 51 do not penetrate the soil to a great depth, they are caused to rotate by penetration into the soil. However, as the cleaning wheels 51 rotate the teeth 52 at their lower peripheries engage mulch in addition to the soil and the forces applied to the mulch move the mulch to the side and clear the path in front of the opening discs 32. This shallow penetration provides mulch movement, however, the tined elements 52 may impale certain residue and such residue may accumulate on the tined elements along with dirt between the tines to such a depth that the operation of tined wheel is impaired. Applicant's invention is designed to prevent this from happening and as illustrated in FIGS. 2 and 6 will remove such residue from the tined teeth and also any residue including dirt and rocks which accumulates between the teeth.

Figure 2:
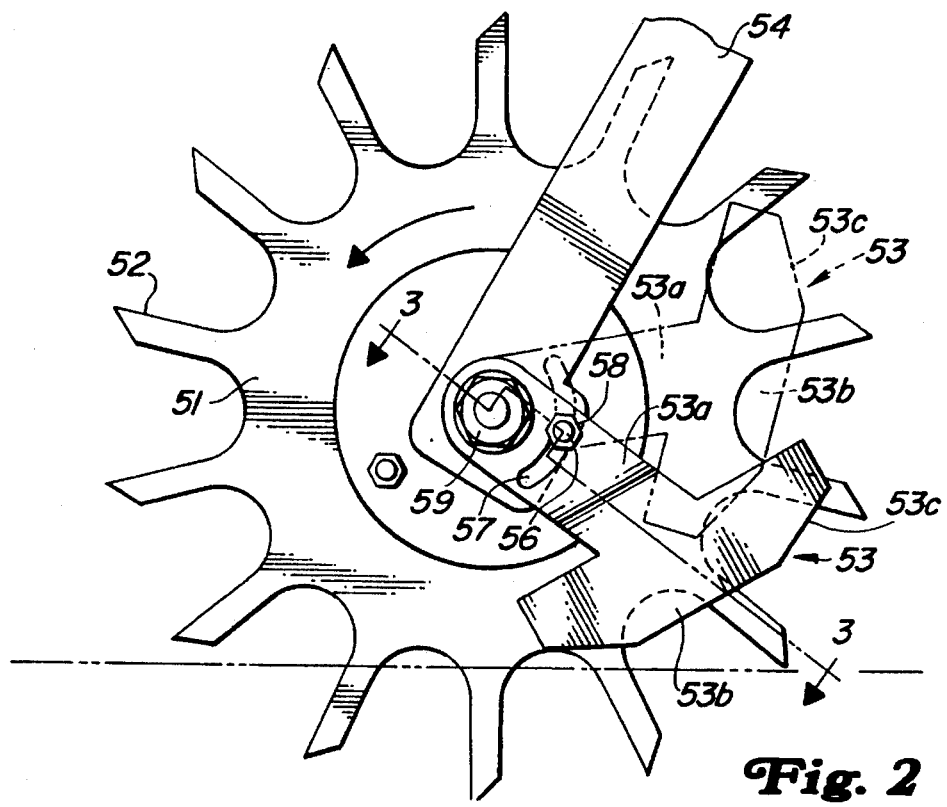
FIG. 2 is a detailed side view of one embodiment of applicant's invention applied to a rotating tined wheel penetrating the soil.
Figure 6:
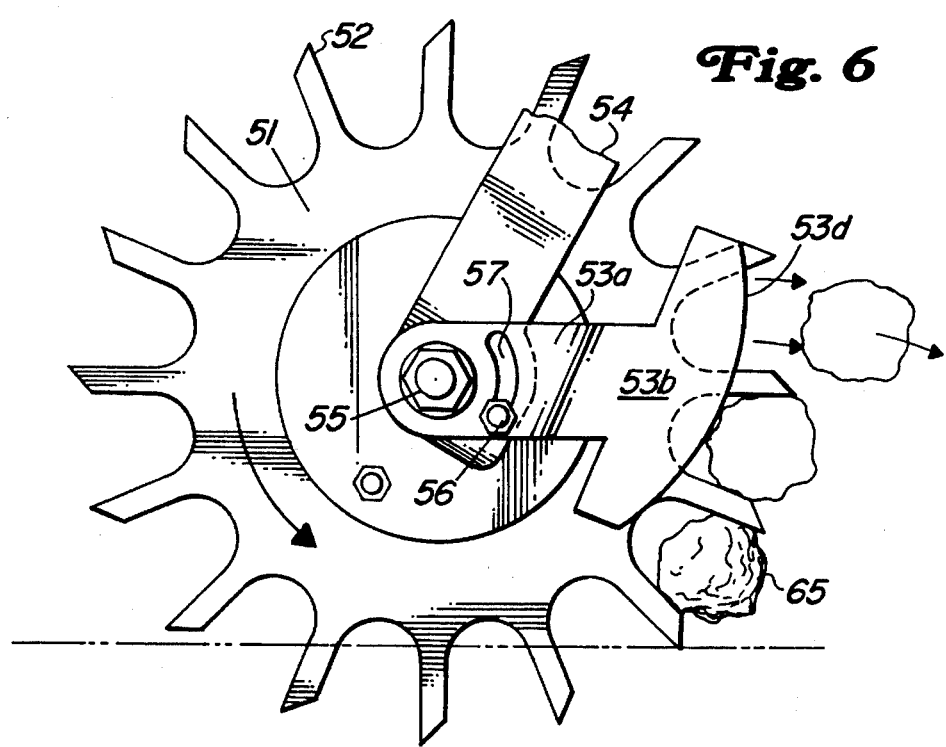
FIG. 6 is a detailed side view of another embodiment of applicant's invention applied to a rotating tined wheel penetrating the soil.

As illustrated in FIGS. 2, 5, and 6, applicant's invention is also useful in clearing packed material from tined toothed wheels which penetrate the earth to a greater depth than the furrow opening wheels or cleaning wheels. Such operation and penetration of tined toothed wheels occurs when the wheels are utilized as the furrow closing wheels 33 as disclosed in my co-pending application Ser. No. 08/154,975. Indeed tooth packing, i.e., the filling of the openings between the teeth with residue, rocks or soil, will occur in the closing wheels 33 or other deep penetrating tined wheels in soil which may or may not include residue. This is especially true of damp soil and the packing will be amplified with damp residue. Packing will occur to a greater degree when the residue is mixed with the soil because of the cultivation by the tined toothed wheels. Each successive revolution of the tooth produces more packing as the teeth penetrate the soil and soil is pressured against the root of the teeth and is compacted by the pressure in the space between the teeth.

The prior art has not disclosed any means of keeping a tined toothed wheel which penetrates the soil clear of residue, rocks, and/or soil between the teeth. This accumulation or packing, if not removed, prevents penetration of the teeth to a controlled or desired depth in the soil.

Applicant's invention as illustrated in FIGS. 1, 2, 5 and 6 solves this problem by utilizing a member or strip 53 of hardened wear-resistant material such as metal mounted on the axis 51 to a bracket 54 which is secured from rotation, the axis about which toothed wheel 51 rotates. As best illustrated in FIG. 3, the novel cleaning strip 53 of applicant's invention is generally rectangular and mounted to a bracket 54 to rotate around the axis 55. The mounting portion 53(a) is parallel to the radial plane of the toothed wheel and is secured a predetermined axial distance away from the toothed wheel 51. The novel member 53 is bent so that one portion and the edge portion thereof is positioned toward and close to the toothed wheel 51. The angle theta ($\Theta$) at which the member 53 is bent is determined by the forces required in cleaning the tined wheel 51, however, the angle should be gentle enough to deflect in a smooth manner as the wheel rotates the residue wedged between the teeth outwardly from the root of the tooth toward the tip of the tooth. This angle $\Theta$ may range between 15° and 45°.

The cleaning operation is best shown and described using FIGS. 2 and 6. Once the material is placed in motion away from the root of the tooth by the cleaning strip 53, inertia and the shape of the deflector strip 53 will keep the residue moving toward the end of the tooth. Deflector or cleaning strip 53 should not touch the wheel 51 or the teeth 52, but should be located close enough to the wheel and teeth to remove the residue packed between the teeth yet have no friction on the wheel when the deflector action is not required. It has been found that approximately ⅛ inch distance from the tooth and wheel will permit the cleaner to operate properly and not drag on the wheel when not needed. In one embodiment which was used the cleaning strip 53 was ⅛ths inch thick and 1 inch in width at the cleaning surface and 6 inches in length. The material used was metal.

As shown in FIGS. 3 and 4 the deflector or cleaning strip 53 has a portion or arm designated as 53a which is mounted by means of the support or bracket member 54, the screw member 55, along the axis of the mounting of toothed wheel 51 and the bearing 60.

The arm portion 53a of the stripping mechanism 53 includes means for adjusting the position of the cleaning strip 53 radially about the axis of screw member 55. Adjusting means may be a cut-out 57 as shown through which a bolt 56 with nut 58 or other mounting means securely holds the bracket 54 in a predetermined radial position about the axis 55 to obtain the desired dispersion of the residue. The cleaning arm 53 is secured in the desired location by the bolt 56 and nut 58 holding the arm 53a in a fixed position. The adjustability permitted by this arrangement allows the cleaning member 53 to vary the deflection of the residue. If a narrow deflection path of the residue is desired, deflection of the residue should take place near the soil line as shown in FIG. 2 or by rotating the axis to a radial position further from the ground as shown in FIGS. 2 and 6 the residue will be lifted to a point where when removed from the wheel it is thrown by centrifugal force further from the wheel creating a wider dispersion of the residue.

In the preferred embodiment the invention was utilized on tined toothed wheels where the cleaner 53 was ⅛ths inch thick, 1 inch wide and 6 inches in length as stated above, and in position extended across the teeth from the base or the root of the tooth 52 to approximately the point of the tooth 52 as the wheel is rotated. The cleaning edge of the cleaning device may vary from a straight line, i.e., a simple rectangular piece to a piece having beveled edges 53b as shown in FIG. 2 to a circular edge 52c as shown in FIG. 6. The best results were obtained with the circular surface as shown in FIG. 6. Though the other variations performed satisfactorily under certain conditions.

In effect, this novel row cleaning device occupies a portion of a chord on the circular tined wheel unit 51, i.e., the row cleaning device 53 extends from the base of a tooth to the tip of a subsequent tooth. As the toothed wheel 51 is rotated, the points of contact of the edge of this cleaning device move from the base or root of the tooth to the tip of the same tooth as the tooth is rotated. Thus ensuring a clean wiping action forcing the debris gently from the space between the teeth.

Having described the preferred embodiment, other features of the present invention will undoubtedly occur to those versed in the art, as will numerous modifications and alterations in the embodiments of the invention illustrated, all of which may be achieved without departing from the spirit and scope of the invention as defined in the appending claims.

What is claimed is:

1. A cleaning device for removing debris from the teeth of a wheel having a plurality of spaced apart teeth on the periphery, the wheel mounted on a framework on an axis to permit rotation of said wheel during forward movement of said framework so that the teeth penetrate the soil as the wheel rotates comprising:

a flat unitary plate member of wear-resistant material having a first portion;

said axis of said wheel extending through said first portion of said member so that said member is rotatably and adjustably mounted at a distance from said wheel about the axis of said wheel, said members secured in a predetermined circumferential relationship with said wheel;

a generally rectangular second portion of said member angled from said first portion in the axial direction toward the adjacent face of said wheel, said second portion adjacent said teeth on said wheel; and said second portion including an edge of one side of said second portion positioned on a chord of said wheel, whereby as said wheel rotates said second portion and said edge of said second portion will eject material collected between said teeth.

2. A cleaning device as set forth in claim 1, wherein said first portion of said member is rotatable about said axis for changing the circumferential location of said member to vary the discharge pattern of said debris from said wheel.

3. A cleaning device as set forth in claim 2, wherein the circumferential location of said member is rotatable using a fixed male device on said framework and an arcuate female slot in said member moveable along said male device.

4. A cleaning device as set forth in claim 3, wherein said male device comprises a bolt and a nut.

5. A cleaning device as set forth in claim 1, wherein said edge of said second portion extends on a chord of said wheel from the base of a first tooth to the tip of a second tooth, said second tooth being at least two teeth from said first tooth in the direction of rotation of said wheel.

6. A cleaning device as set forth in claim 5, wherein said edge of said second portion is beveled adjacent the base and tip of said first and said second teeth respectfully.

7. A cleaning device as set forth in claim 5, wherein said edge of said second portion adjacent said wheel is curved between the base of said first tooth and the tip of said second tooth.

8. A cleaning device as set forth in claim 1, wherein said second portion is angled toward said rotating wheel at an angle between 20° and 45°.

* * * * *